United States Patent
Kunemund et al.

(10) Patent No.: US 6,873,558 B2
(45) Date of Patent: Mar. 29, 2005

(54) INTEGRATED CIRCUIT AND METHOD FOR OPERATING THE INTEGRATED CIRCUIT

(75) Inventors: Thomas Kunemund, Munich (DE); Andreas Wenzel, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/870,451

(22) Filed: Jun. 15, 2004

(65) Prior Publication Data

US 2004/0228190 A1 Nov. 18, 2004

Related U.S. Application Data

(63) Continuation of application No. PCT/DE02/04750, filed on Dec. 27, 2002.

(30) Foreign Application Priority Data

Jan. 24, 2002 (DE) .......................................... 102 02 726

(51) Int. Cl.[7] .................................................. G11C 7/00
(52) U.S. Cl. .................... 365/203; 365/189.12; 365/202
(58) Field of Search ................................ 365/203, 202, 365/205, 207, 189.11, 189.12, 230.02

(56) References Cited

U.S. PATENT DOCUMENTS

| | | | |
|---|---|---|---|
| 4,555,777 A | 11/1985 | Poteet | |
| 4,813,024 A | 3/1989 | Lisimaque | |
| 5,481,500 A * | 1/1996 | Reohr et al. | ................. 365/203 |
| 5,825,224 A | 10/1998 | Klass | |
| 6,084,455 A | 7/2000 | Matson | |
| 6,107,853 A | 8/2000 | Nikolic | |
| 2001/0004220 A1 | 6/2001 | Pomet | |
| 2004/0223383 A1 * | 11/2004 | Kuenemund et al. | |

FOREIGN PATENT DOCUMENTS

| | | |
|---|---|---|
| DE | 199 10 184 A1 | 9/2000 |
| DE | 100 00 503 A1 | 7/2001 |
| EP | 1 115 094 A2 | 7/2001 |

* cited by examiner

Primary Examiner—Michael S. Lebentritt
Assistant Examiner—Hien Nguyen
(74) Attorney, Agent, or Firm—Darby & Darby

(57) ABSTRACT

An integrated circuit having first connections, a first memory cell, first and second prechargers, and first and second data transmission devices. The first connections have a dual-rail signal applied thereto. The first memory cell is connected to the first connections and buffer-stores the dual-rail signal applied to the first connections. The first precharger precharges first lines, which are connected to the first connections. The first data transmission device, which forwards the dual-rail signal stored in the first memory cell to second connections, which are connected to a second memory cell which transmits the dual-rail signal to the first connections again using the second data transmission device. The second precharger precharges second lines, which are connected to the second connections.

13 Claims, 9 Drawing Sheets

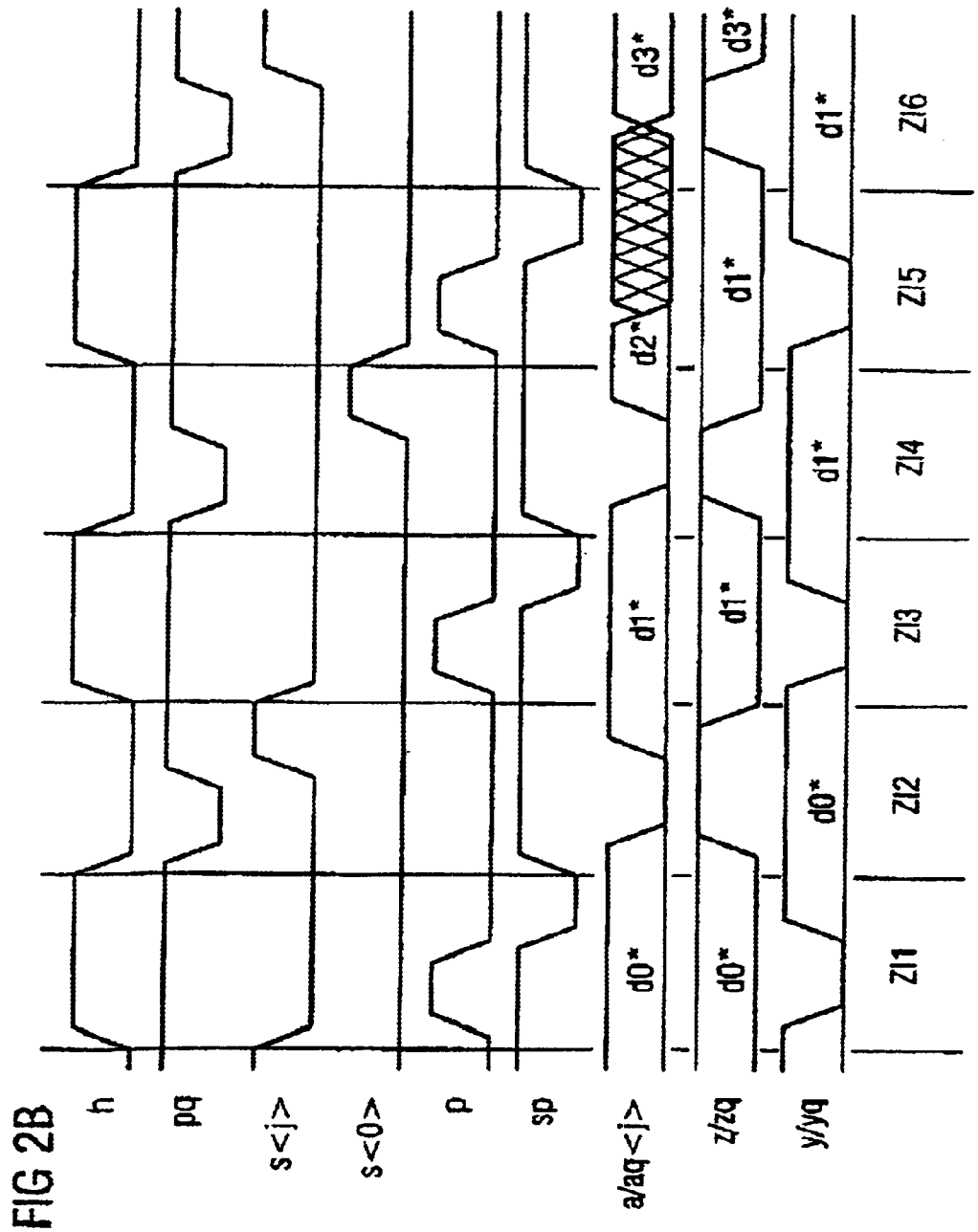

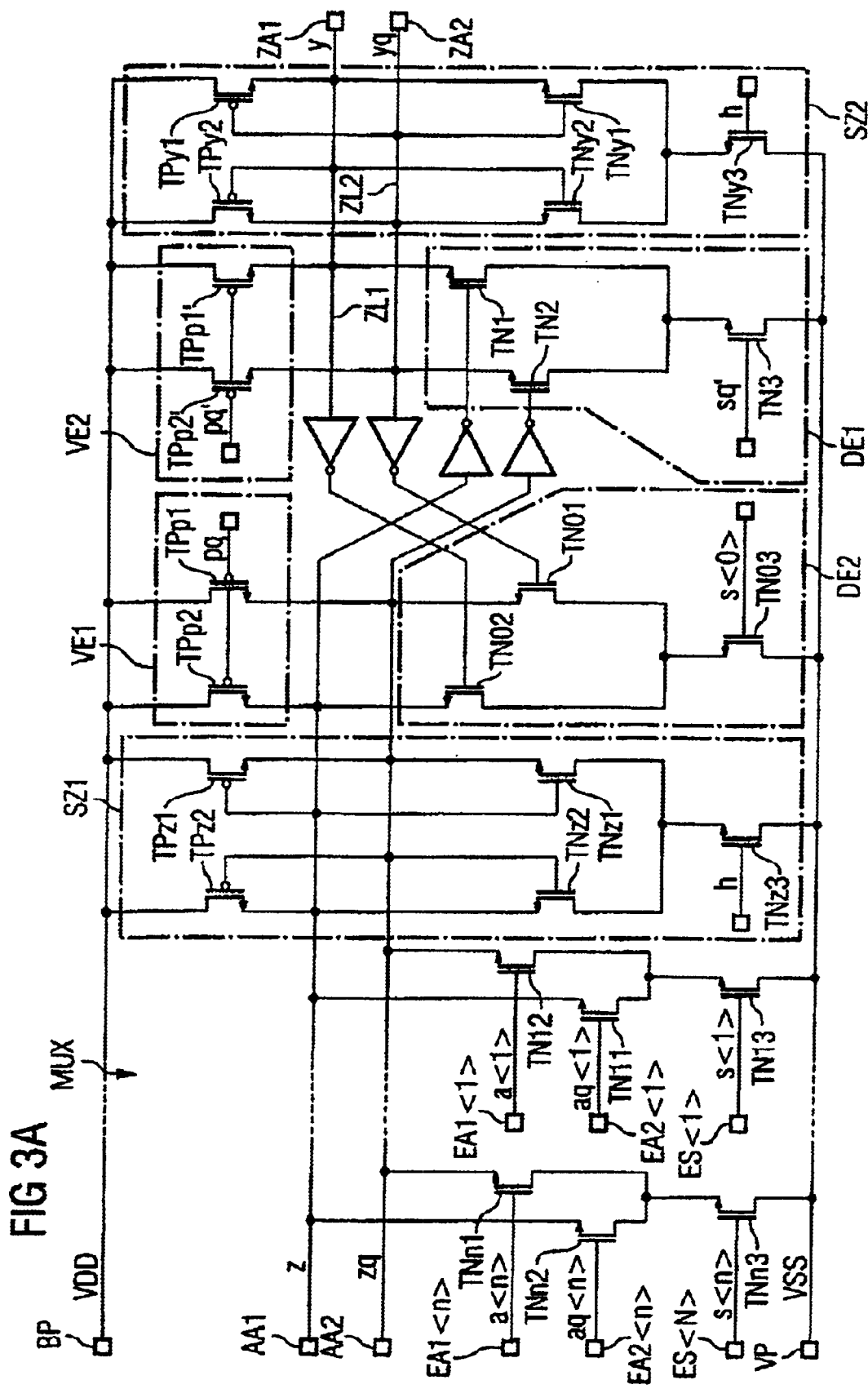

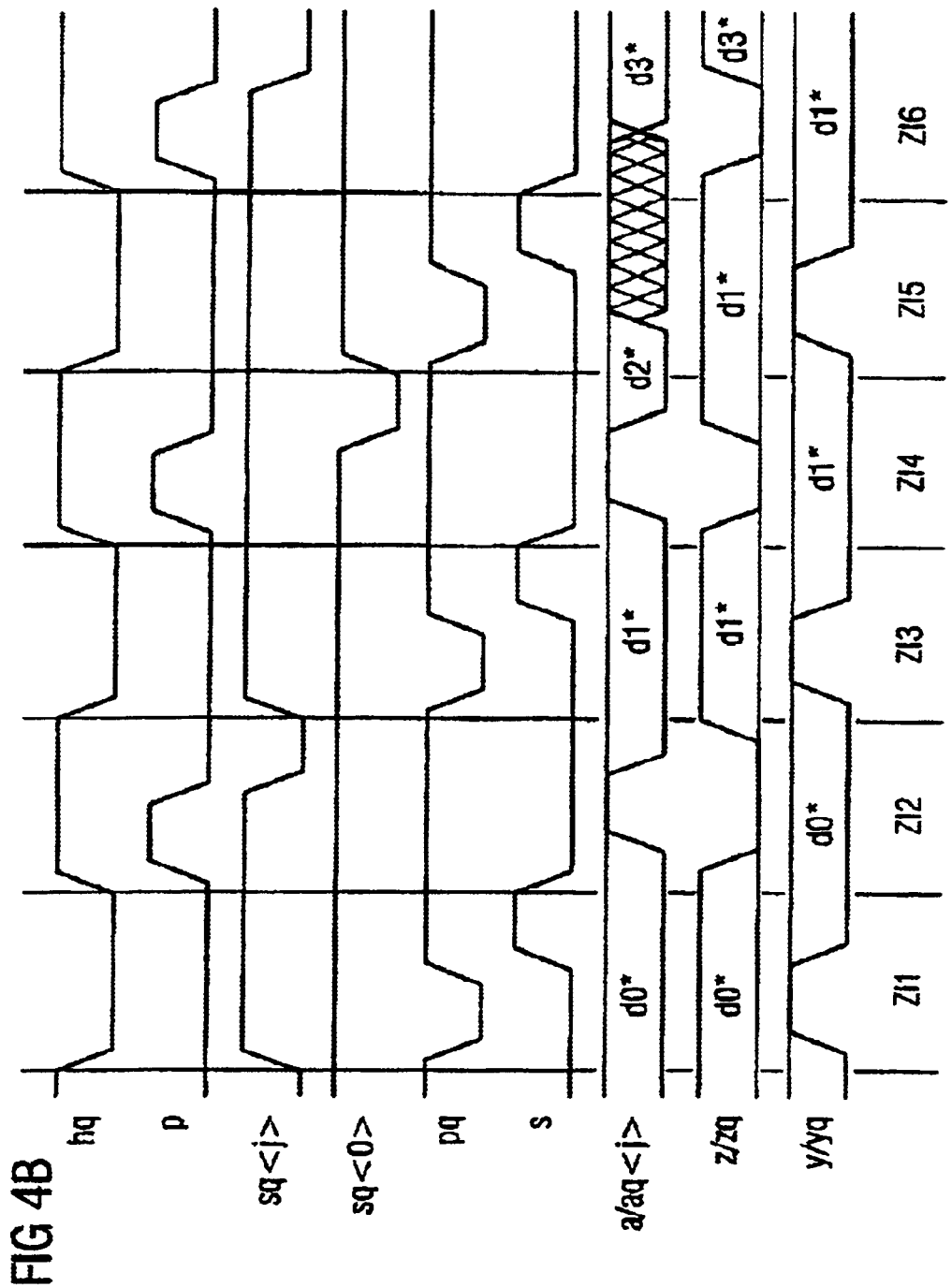

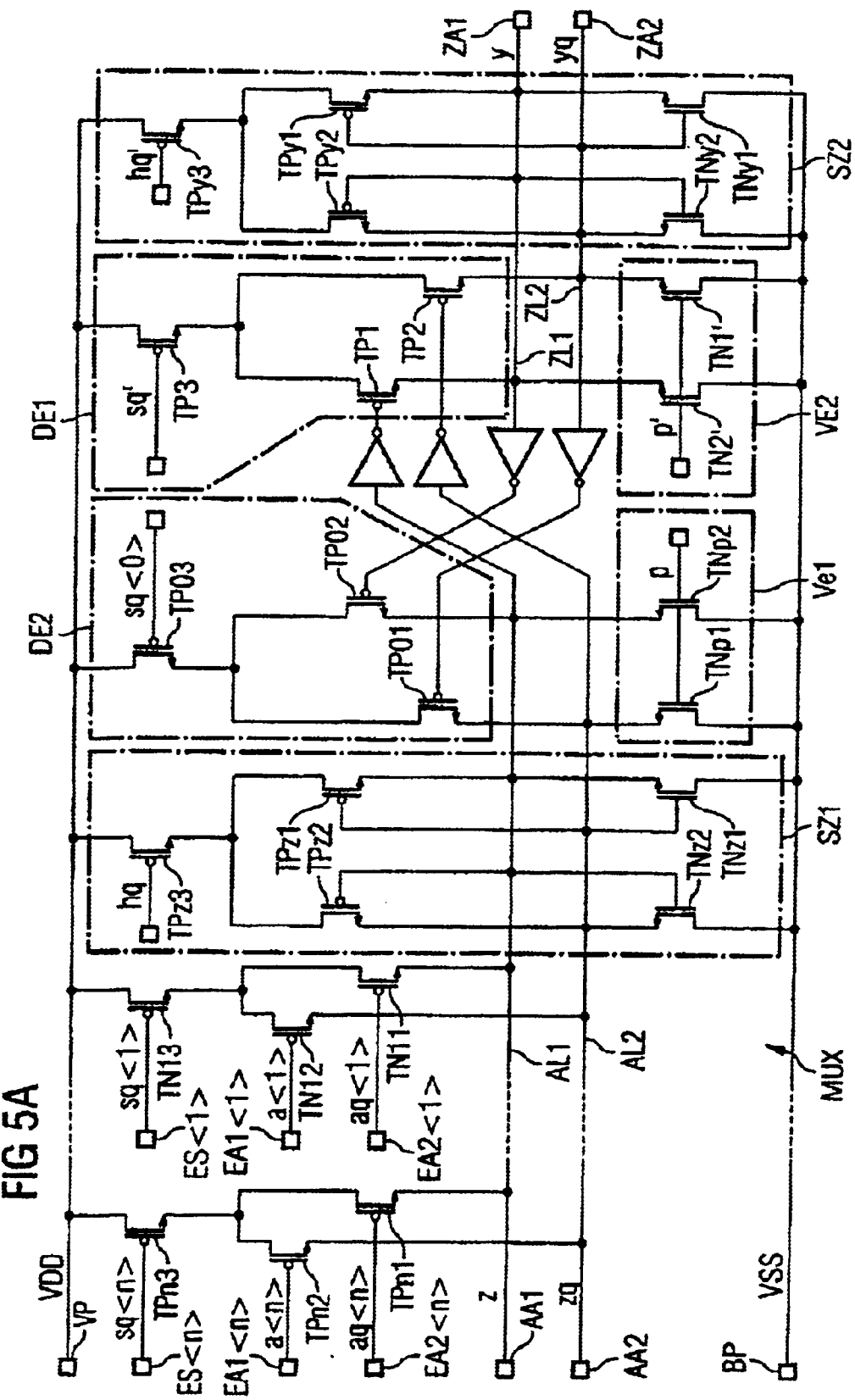

INTEGRATED CIRCUIT AND METHOD FOR OPERATING THE INTEGRATED CIRCUIT

CROSS-REFERENCE TO RELATED APPLICATION

This application is a continuation of International Patent Application Serial No. PCT/DE02/04750, filed Dec. 27, 2002, which published in German on Jul. 31, 2003 as WO 03/063354, and is incorporated herein by reference in its entirety.

FIELD OF THE INVENTION

The invention relates to an integrated circuit designed using dual-rail technology and to a method for operating same.

BACKGROUND OF THE INVENTION

In every modern microprocessor or microcontroller, step-by-step execution of an algorithm is accompanied by the occurrence of states which necessitate a temporary interruption in program execution. The cause can be instructions or data which are not yet available, for example. Where possible, the interruption should occur such that the information available at the time of the interruption or the data available is or are fully preserved. The states reached during program execution—including intermediate results already calculated—therefore need to be "frozen" for each of the successive steps of the algorithm such that program execution can be continued with minimal delay as soon as the information required for this purpose, namely the previously missing instruction or the missing data item, is available.

A schematic representation of the circuitry in this situation is given in FIG. 1. This shows just one bit of a data path and just one substep (k) in program execution. The states and intermediate results $z_k$ corresponding to the substeps k=1,2, . . . in the execution of the program are either calculated in arithmetic and logic circuits from $z_{k-1}$ and control signals $ctl_k$ (data signal $a_k<1>$) or are accepted from adjacent bits in the data path, or are supplied externally ($a_k<n_k{:}2>$) and are then stored in respectively associated register circuits which each have a clock input. The described "freezing" of the register contents $z_k$ corresponding to the states is produced by means of feedback, where the data output of the register <k> is connected to the multiplexer circuits situated upstream of the input for the registers. In this arrangement, each of the multiplexer circuits has a control input to which a control signal $sel_k<s_k{:}1>$ is applied. The combination of the multiplexer and the register is surrounded by a dashed line in FIG. 1.

In the case of the schematic circuit indicated in FIG. 1, each bit of a state stored in the registers is physically represented by a single electrical node at the output of the register. For the "single-rail" circuitry, so-called for this reason, this also applies for all the nodes within the combinational switching circuits (combinational logic and arithmetic), connected downstream of the registers, between the registers and for the register inputs. A single electrical node thus corresponds to the logic value of a state bit.

A drawback of this single-rail technology is the fact that the circuit design or the signals processed in the circuit can easily be spied out. One of the most important methods for attacking chip cards and for assessing the sensitivity thereof in security applications is differential power analysis (DPA). This method is used for deliberate attacks in order to discover confidential information, such as passwords or cryptographic keys.

In this case, the chip card's current profiles measured using statistical methods are evaluated for a given program or for a given algorithm. In particular, charge integrals calculated over one or more clock cycles are evaluated and—if the program is executed a large number of times—the correlation between systematic data variation and respective charge integral can be used to draw conclusions about the information which is to be protected.

It follows from this that the circuits integrated on a chip card need to be of such a type that they deliver the same current profile irrespective of the data which are to be processed, in order to cause differential power analysis to fail.

This is certainly not the case for the single-rail data paths indicated in FIG. 1, however. If program execution is interrupted, as described above, the register outputs are fed back via the multiplexer circuits situated upstream of the inputs. The result of this is the desired freezing of the register contents. Since none of the register nodes situated in the data path undergoes electrical charge reversal, however, a minimal charge integral is obtained for this case.

In contrast to this, at least some of the register contents change over the course of time or clock cycles in the event of program execution not being interrupted. The respective charge integral associated with each state change is therefore a function of those nodes or electrical capacitances which undergo electrical charge reversal. There is thus a strong dependence on the changes in the data to be processed over time. This statement applies not just to the register nodes shown in FIG. 1 but also to all nodes within switching circuits between the registers.

Changing charge integrals can be prevented by using "dual-rail technology". In contrast to conventional single-rail technology, where each bit within a data or signal path is physically represented by a single electrical node k in a switching circuit or switching mechanism, the implementation using dual-rail technology involves each bit being represented by two nodes k and kq, with this bit having a valid logic value if k corresponds to the true logic value b for this bit and kq corresponds to the complementary value bn=not(b).

The desired invariance in the charge integrals is achieved in this case by virtue of a "precharge" state having been inserted between two states with valid logic values (b, bn)=(1,0) or (0,1). In this precharge state, both k and kq are charged to the same electrical potential, and thus assume logically invalid values (1,1) or (0,1). For the precharge state (1,1), a state sequence might have the following appearance:

(1,1), (0,1), (1,1), (1,0), (1,1), (1,0), (1,1), (0,1), . . .

For any of such state sequences, it holds true that any passage from (1,1) to (b, bn) involves a single node having its charge reversed from 1 to 0, and all (b, bn) to (1,1) states involve a single node having its charge reversed from 0 to 1. This is true irrespective of the logically valid value b of a respective state bit. Naturally, a similar situation also applies for state sequences with the precharge state (0,0).

It follows from this is that the charge integrals corresponding to these state sequences are independent of the sequence (b, bn) of the logically valid values. It is merely necessary to ensure that the nodes k and kq have the same electrical capacitances. The current profile for a data path implemented in this way is thus no longer dependent on variations in the data to be processed over time. A circuit designed using dual-rail technology is thus resistant to differential power analysis.

It is therefore the object of the present invention to provide a data path register which allows its contents to be "frozen" and at the same time features protection against differential power analysis.

SUMMARY OF THE INVENTION

This object is achieved by an integrated circuit having the features of the independent patent claims. Advantageous refinements can be found in the dependent claims.

The invention proposes an integrated circuit having the following features:
- two first connections to which a dual-rail signal can be applied,
- a first memory cell, which is connected to the first connections and buffer-stores the signal applied to the first connections,
- a first means for precharging first lines, which are connected to the first connections,
- a first data transmission device, which forwards the dual-rail signal stored in the first memory cell to second connections, which are connected to a second memory cell which is able to transmit this signal to the first connections again using a second data transmission device, and
- a second means for precharging the second lines, which are connected to the second connections.

The integrated circuit allows the data signal applied to the first connections to be "frozen" by transmitting it from the first memory cell to the second memory cell. As will become clear from the description below, this data transmission is effected at cyclic intervals. This means that every data signal applied to the first connections is transmitted from the first to the second memory cell. The integrated circuit now provides a way of returning the data buffer-stored in the second memory cell to the first memory cell or to the first connections when required, so that it can be tapped off on the first connections of another circuit.

The integrated circuit is produced using the dual-rail technology described in the introduction. This means that the information in each bit is transmitted via two lines. The first and second memory cells are therefore of a type such that they can each store the information of the logically valid value and of the complementary value. To preserve the desired charge neutrality, both the lines which are associated with the first connections and the lines which are associated with the second connections and which transport the data signal from the second memory cell are connected to means which precharge the respective line. Depending on whether the means for precharging the lines are connected to a supply potential or to a reference-ground potential, a precharge state of (1,1) or (0,0) is achieved.

The integrated circuit thus permits a data path register in which it is possible to "freeze" the integrated circuit's contents. In this context, there is the assurance that no different charge integrals can arise, irrespective of variations in the data to be processed over time.

In one preferred refinement of the integrated circuit, the first and second memory cells are in the form of back-to-back connected inverters. Memory cells connected in this manner are of particularly simple design and can be produced using few components.

Preferably, the first and second memory cells are coupled via a respective selection transistor to a supply potential connection whose control connections have a respective clock signal applied to them. In this case, a first logic value for the clock signal involves the first memory cell having a dual-rail signal written to it while the second memory cell holds the dual-rail signal written to it, whereas a second logic value for the clock signal involves the second memory cell having a dual-rail signal written to it while the first memory cell holds the dual-rail signal written to it. This refinement allows cyclic transmission of the signal stored in the first memory cell to the second memory cell.

In another preferred variant, the first means for precharging first lines, which are connected to the first connections, comprises two switching elements which are connected between a supply potential line and a respective first line. In a corresponding manner, provision is made for the second means for precharging second lines, which are connected to the second connections, likewise to comprise two switching elements which are connected between a supply potential line and a respective second line. In this case, the switching elements for the first and second means are activated cyclically, with activation being dependent on the state of the clock signal applied to the memory cells.

In another advantageous refinement, the first data transmission device has two switching elements whose control connections are respectively connected to one of the first connections. In addition, a selection transistor is provided which is connected between a supply potential line and one respective main connection on the two switching elements, with the respective other main connection on the switching elements being connected to one of the second connections.

In a corresponding manner, the second data transmission device has two switching elements whose control connections are respectively connected to one of the second connections. In addition, a selection transistor is provided which is connected between a supply potential line and a respective main connection on the two switching elements, with the respective other main connection on the two switching elements being connected to one of the first connections.

The selection transistor for the first data transmission device, which transmits data from the first to the second lines, is activated at cyclic time intervals. The time at which the selection transistor and hence the data transmission unit become active is dependent on the state of the clock signal. Activation of the second data transmission device, which transmits a data value back from the second to the first memory cell, is brought about by a control device which is independent of the inventive integrated circuit. The control device can be formed together with the inventive integrated circuit in the same substrate. The control device could also be in the form of an external module, however, which applies the necessary signals to respective connections.

In another advantageous refinement, provision is made for the first connections to be output connections which form a data output and are connected via a circuit arrangement to a data input which comprises at least two input connections and to which a dual-rail signal can be applied. The circuit arrangement forwards the dual-rail signal applied to the input connections to the output connections on the basis of a selection signal. The data input can advantageously be in the form of a multiplexer.

In the simplest case, the integrated circuit has just one data path. In this case, the integrated circuit has only two input connections, which are connected to the first connections via said circuit arrangement. The data input does not have to be in the form of a multiplexer in this case either.

If, by contrast, the integrated circuit has a plurality of data paths, then two input connections and a respective circuit arrangement associated with these input connections are provided for each bit (that is to say for each data path). Each of these circuit arrangements is then connected to the first connections of the integrated circuit. Only one data path is connected to the first connections by means of a selection signal, however. Which data path is connected to the first connections is controlled by applying a selection signal to the circuit arrangement in question. It is again possible for the selection signal to be actuated or applied by a control device which is not present in the inventive integrated circuit. All of the input connections and all of the respectively associated circuit arrangement together with the associated selection means are referred to as a multiplexer.

The method for operating the inventive integrated circuit comprises the following steps:

the selection transistors for the first and second memory cells have a clock signal applied to them, the first means for precharging the first lines is activated as a result of a falling clock edge, the second means for precharging the second lines is activated as a result of a rising clock edge, the first data transmission unit is activated following deactivation of the second means for precharging the second lines, as a result of which the dual-rail signal applied to the first connections is transmitted to the second memory cell, the second data transmission unit is activated if the dual-rail signal stored in the second memory cell needs to be available on the first output connections.

In particular, the first and second means for precharging respective lines are activated by actuating the respective switching elements. The first and second data transmission units are activated by actuating a respective selection transistor.

In one preferred embodiment, the switching elements and selection transistors are actuated using a control circuit, which need not be part of the inventive integrated circuit. Instead, the control circuit could be produced in another substrate or could even be a separate module.

BRIEF DESCRIPTION OF THE DRAWINGS

The invention and the way in which it works are explained in more detail below with reference to the figures, in which:

FIG. 2b shows the timing of the data and control signals in the circuit from FIG. 2a;

FIG. 3a shows a second exemplary embodiment of the inventive integrated circuit;

FIG. 3b shows the timing of the data and control signals in the circuit from FIG. 3a;

FIG. 4b shows the timing of the data and control signals in the circuit from FIG. 4a;

FIG. 5a shows a fourth exemplary embodiment of an inventive integrated circuit; and FIG. 5b shows the timing of the data and control signals in the circuit from FIG. 5a.

DETAILED DESCRIPTION OF THE PREFERRED MODE OF THE INVENTION

Figure 1:
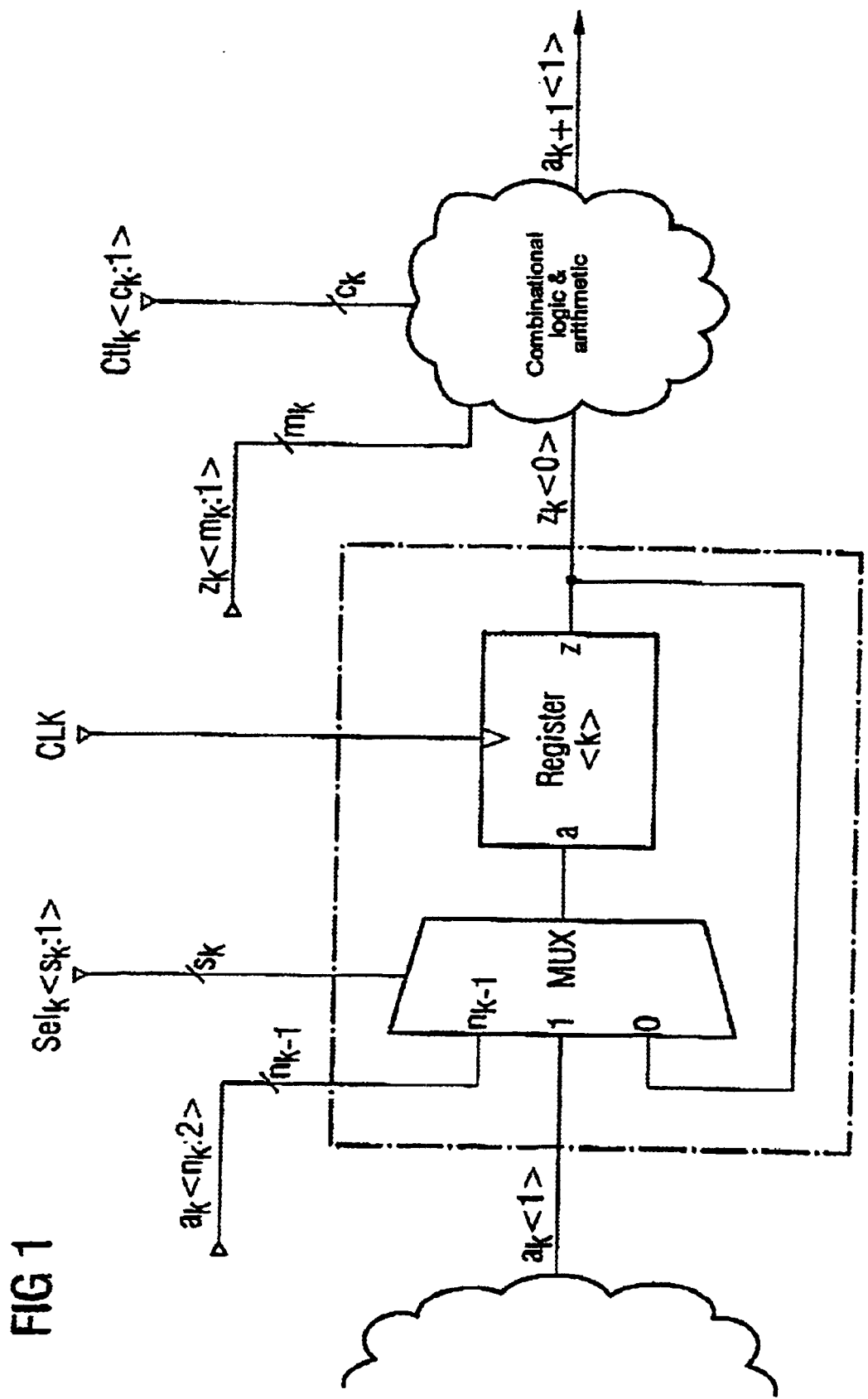
FIG. 1 shows a schematic illustration of a data path register using single-rail technology.

FIGS. 2a, 3a, 4a and 5a show exemplary embodiments of the inventive integrated circuit. They respectively show the combination of the multiplexer MUX and of the register <k> surrounded by dashes in FIG. 1. In all the exemplary embodiments, identical elements have been denoted using identical references. The references TP, TN shown beside respective transistors denote P-channel transistors and N-channel transistors, respectively. The reference <1>, . . . <n> respectively denotes a data path. The value indicated in acute brackets is representative of the jth bit, where j=1 . . . n.

Figure 2A:
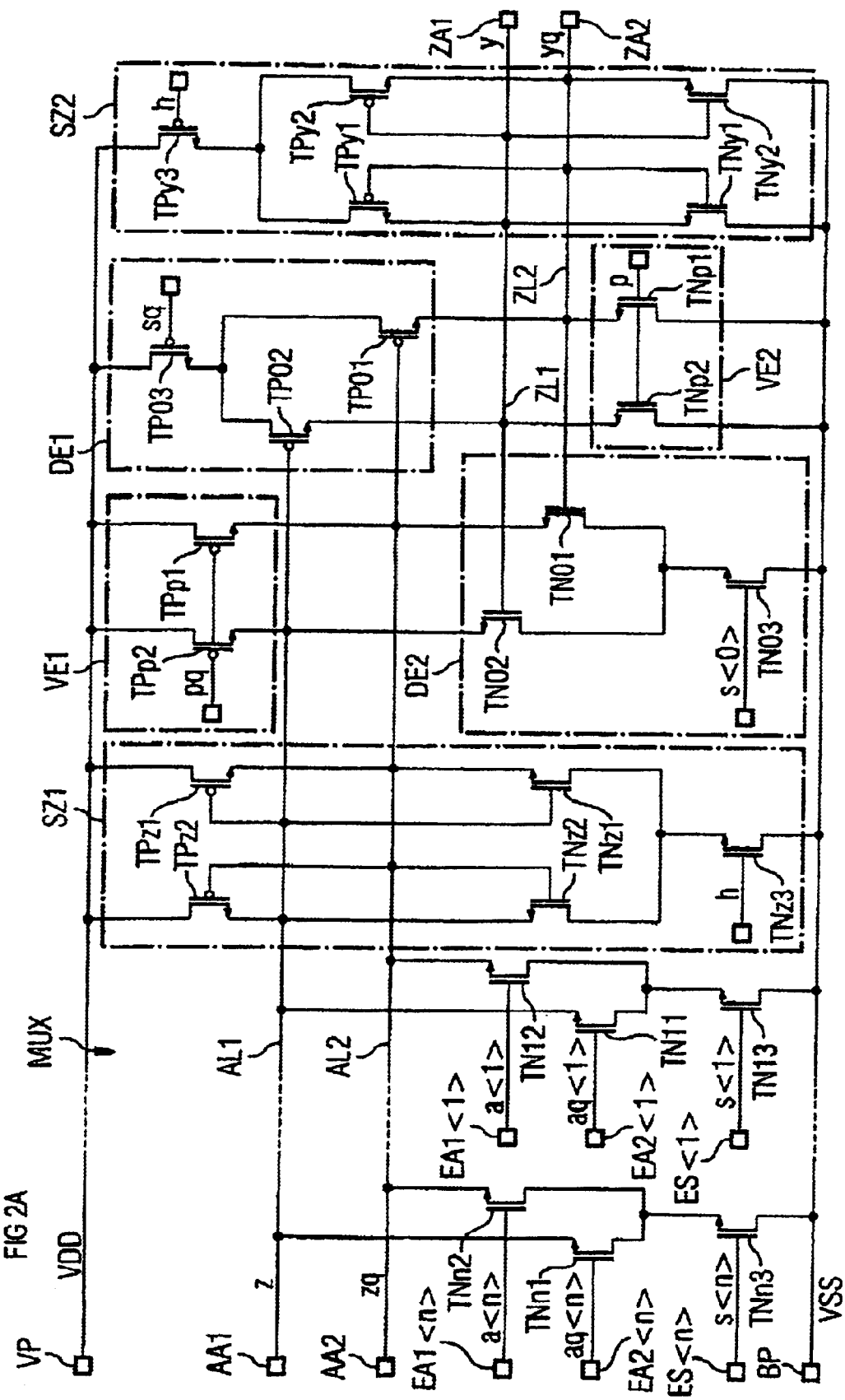
FIG. 2a shows a first exemplary embodiment of the inventive integrated circuit.

In the description below, reference is made to FIG. 2a, which is explained together with the timing of the data and control signals which is indicated in FIG. 2b.

The integrated circuit has input connections EA1<j>, EA2<j>, where j=1 . . . n. For each bit or each data path, two input connections EA1<j>, EA2<j> are provided. The input connection EA1 has the logically valid signal a<n> applied to it, while the input connection EA2 can have the complementary signal aq<j> applied to it. The input connections EA1<j> and EA2<j> are respectively connected to control connections on transistors TNj2, TNj 1. Together with a selection transistor TNj3, to whose input connection ES<j> a selection signal s<j> can be applied, these form a circuit arrangement which passes the input signals a<j>, aq<j> to first lines AL1, AL2. The selection transistors TNj3 are connected between a reference-ground potential connection BP and the respective source connections on the transistors TNj 1, TNj2. The signals are output only if the transistor TNj3 is on. Since the arrangement forms a multiplexer, only one of the n transistors TNj3 can ever be turned on. The rest of the transistors have a signal applied to them which turns them off.

The first lines or output lines AL1, AL2 are connected to first connections AA1, AA2, on which it is possible to tap off the input signal a<j>, aq<j> applied from the input connections EA1<j>, EA2<j>. This dual-rail signal which can be tapped off on the first connections or the output connections AA1, AA2 is denoted by z, zq.

The first connections AA1, AA2 have a memory cell SZ1 connected to them. The memory cell SZ1 comprises two back-to-back connected inverters. The first inverter is formed by the transistors TNz2, TPz2. The second inverter is formed by the transistors TPz1, TNz1. In addition, the memory cell SZ1 features a selection transistor TNz3 whose control connection can have a clock signal h applied to it. The selection transistor TNz3 is connected between the reference-ground potential connection BP and the inverters. The outputs of the inverters are connected to the first lines AL1, AL2.

If the clock signal h has the logic value 0, the value which is on the first lines AL1, AL2 is written to the memory cell SZ1. If the clock signal changes from logic 0 to logic 1, then the value in the memory cell SZ1 is held, since the inverters are connected to reference-ground potential by the selection transistor TNz3, which is on.

In line with the dual-rail principle, the first lines AL1, AL2 are brought to a precharge state, in which the first lines AL1, AL2 have the same potential applied to them, after a logically valid state. In the present integrated circuit, this is brought about the means VE1, which can be referred to as a precharging device. Precharging of the first and second lines AL1, AL2 is initiated as soon as the clock signal h changes its value from logic 1 to logic 0. The means VE1 comprises two transistors TPp1, TPp2 which each have the same control signal pq applied to them. The control signal pq is a cyclic signal which is firmly coupled to the clock signal h. The transistors TPp1, TPp2 in the means VE1 are connected between a supply potential connection VP and the first lines AL1, AL2. The first lines AL1, AL2 thus assume the value (1,1) in their precharge state.

A data transmission device DE1, comprising the transistors TP01, TP02 and the selection transistor TP03, transmits the signals which are on the first lines AL1, AL2 to second lines ZL1, ZL2. For this purpose, the data transmission device DE1 needs to have been turned on by means of the selection transistor TP03. The selection signal sq applied to the selection transistor TP03 is in sync with the clock signal h, which means that cyclic data transmission takes place. As a result, the data are transmitted from the first memory cell SZ1 to a second memory cell SZ2.

The second memory cell SZ2 likewise comprises back-to-back connected inverters. The first inverter is formed by the transistors TPy1, TNy1. The second inverter is formed by the transistors TPy2, TNy2. The output of the inverters is connected to the second lines ZL1, ZL2.

Buffer-storage in the second memory cell SZ2 is effected only if said memory cell has been turned on by means of a selection transistor TPy3, to which the clock signal h is applied. In the present case, the selection transistor TPy3 is situated between the supply potential connection VP and the back-to-back connected inverters.

In order to achieve the desired charge neutrality on the second lines ZL1, ZL2 as well, the second lines ZL1, ZL2 also have an associated means VE2 for precharging these lines, which can likewise be referred to as a precharging device. The means VE2 features the transistors TNp1, TNp2, which each have the same control signal p applied to them. The means VE2 is connected between the second lines ZL1, ZL2 and the reference-ground potential BP.

As already explained in the introduction, in modern processors, states necessitating a temporary interruption in program execution arise during step-by-step execution of an algorithm. In this case, the information available at the time of the interruption should be fully preserved. For this purpose, the second memory cell SZ2 is used. This ensures that the states reached in the program flow can be frozen. If it is possible to continue program execution, then the data stored in the second memory cell SZ2 can be transmitted to the first connections AA1, AA2 again using the second data transmission device DE2, which is connected between the output of the second memory cell SZ2 and the first lines AL1, AL2.

In principle, the design of the second data transmission device DE2 is similar to that of the first data transmission device DE1. A selection transistor TN03 to which a control signal s<0> can be applied is connected between the reference-ground potential connection BP and two switching elements TN01, TL02. The control connections of the transistors TN01, TN02 are connected to the second lines ZL1, ZL2. The drain connections of the transistors TN01, TN02 have a respective connection to the first line AL1, AL2.

The content of a data path register is therefore frozen using feedback. In this case, the data signal applied to the first connections—the output connections—is in principle buffer-stored in a second memory cell. The value stored in the second memory cell SZ2 can be fed back to the first connections at any time using the second data transmission device DE2.

The way in which the integrated circuit works is explained in more detail below with reference to FIG. 2b. The profile of the data and control signals is divided into six time intervals ZI1 to ZI6. The signals h (clock signal), pq, s<j>, s<0>, p and sq denote control signals which are applied to respective circuit blocks which can be seen in FIG. 2a.

The control signals can be produced by a control device. In this case, the control device does not have to be part of the inventive integrated circuit. a/aq<j>, z/zq and y/yq denote the data signals which are applied to the input connections, the first and second connections.

For the first time interval ZI1 indicated, it initially holds true that, when h=1, a value (z, zq)=(d0, d0q)=d0* previously transmitted to the first connections AA1, AA2 via one of the multiplexer inputs (EA1<j>, EA2<j>) is held by the memory cell SZ1. A prerequisite for this is that the control signal pq, which can be attributed to the means for precharging the output lines AL1, AL2, has the logic value 1, and all the control signals s<j>, where j=1, . . . n, and also s<0> have the logic value 0. Hence, neither the means for precharging the output lines VE1 nor the multiplexer inputs ES<j> are active.

At the start of the time interval ZI1, the second lines ZL1, ZL2 are precharged to the value (0,0) using the second precharging unit VE2 (control signal p=1). When the control signal p has assumed its value and, simultaneously with the latter's falling edge, the control signal sq reaches the logic value 0, the value d0* is written on the basis of (y, yq) using the first data transmission unit DE1. In the subsequent time interval ZI2, this value, which is now stored in the second memory cell SZ2, is held with sq=1, p=0 and h=0.

At the same time, the first lines AL1, AL2 are precharged to (z, zq)=(1,1) by means of pq=0 at the start of the time interval ZI2. Next, when pq=1 and s<j>=1, the value d1*= (a<j>, aq<j>)=(d1, d1q), which has since been applied to the input connections EA1<j>, EA2<j>, is written on the basis of (z, zq).

Since the integrated circuit is produced using dual-rail technology, the input lines connected to the input connections EA1, EA2 also have a precharging unit. Hence, for the timing of the input signal (a<j>, aq<j>), there are two possible alternatives, the first of which is shown in the time interval ZI2 and the second of which is shown in the time interval ZI6.

Before one of the multiplexer inputs j is opened when the control signal s<j>=1 (that is to say while s<j>=0), those input lines connected to the input connections EA1, EA2 which are situated upstream of the input of the register (not visible in FIG. 2a) are precharged to a value (0,0). The input signals (a<j> aq<j>) thus obtain the valid logic value d1* either before or after the multiplexer input has been activated.

In the second alternative, the input lines connected to the input connections EA1, EA2 are not precharged. In this variant, however, the input signals (a<j>, aq<j>) need to have reached the valid logic value (in this case d3*) stably before one of the multiplexer inputs ES<j> is opened when s<j>=1.

The time interval ZI3 corresponds to the time interval ZI1. While the clock signal h has the logic value 1, the value d1* will be held in the first memory cell SZ1 [lacuna] the value (z/zq). The second memory cell SZ2 has the value d1* written to it, as described above.

The time interval ZI4 corresponds to the time interval ZI2. While the clock signal h has the logic value 0, the value d1* will be held in the second memory cell SZ2, that is to say d1*=(y, yq). Since the control signal sq changes its logic value to 0 on account of the falling clock edge h, the output lines AL1, AL2 connected to the first connections AA1, AA2 are precharged to (z, zq)=(1,1). When the first precharging unit VE1 has been deactivated again by sq=1, a new signal can be applied to the first connections AA1, AA2.

In contrast to in the time interval ZI2, one of the multiplexer inputs EA1, EA2 is now not activated, but rather the second data transmission unit DE2 is activated by means of the selection signal s<0>. Hence, the data transmission unit DE2 transmits the value d1* to the output connections AA1, AA2, which means (z, zq)=d1*.

The time interval ZI4 thus shows the case of data feedback. The data item d1* has thus been frozen. This means that the value d1* initially transmitted in the time interval ZI2 from the first memory cell SZ1 to the second memory cell SZ2 is written back to the first memory cell SZ1 again in the time interval ZI4. Since the node pairs, that is to say respective lines AL1, AL2 and ZL1, ZL2, are precharged to (1,1) and (0,0) between two respective write operations from (z, zq) and (y, yq), the charge integrals are not just independent of the data changes at the data input, but are also independent of whether new data are transferred from the data input to the first memory cell SZ1 or are fed back from the second memory cell SZ2 to the first memory cell SZ1. However, this situation applies only to the case illustrated in the time intervals ZI2 and ZI4 where the [lacuna] with the input connections EA1<j>, EA2<j> have been precharged to the value (0,0) before they assume their valid logic value. In the case illustrated in the time interval ZI6, the charge integral is independent of the data changes from the first memory cell SZ1 to the second memory cell SZ2, but not of data changes on the input connections EA1<j>, EA2<j>.

In the variant of the inventive integrated circuit which is shown in FIG. 2a, the transistor groups which are "responsible" for the data signal (y, yq) in the second memory cell SZ2, in the second precharging device VE2 and in the second data transmission device DE2 are complementary to the transistor groups which concern the data signal (z, zq). In this context, complementary means that N-channel and P-channel transistors are interchanged.

FIGS. 3a, b to 5a, b show three further exemplary embodiments of the inventive integrated circuit together with the timing of the data and control signals.

Figure 3B:
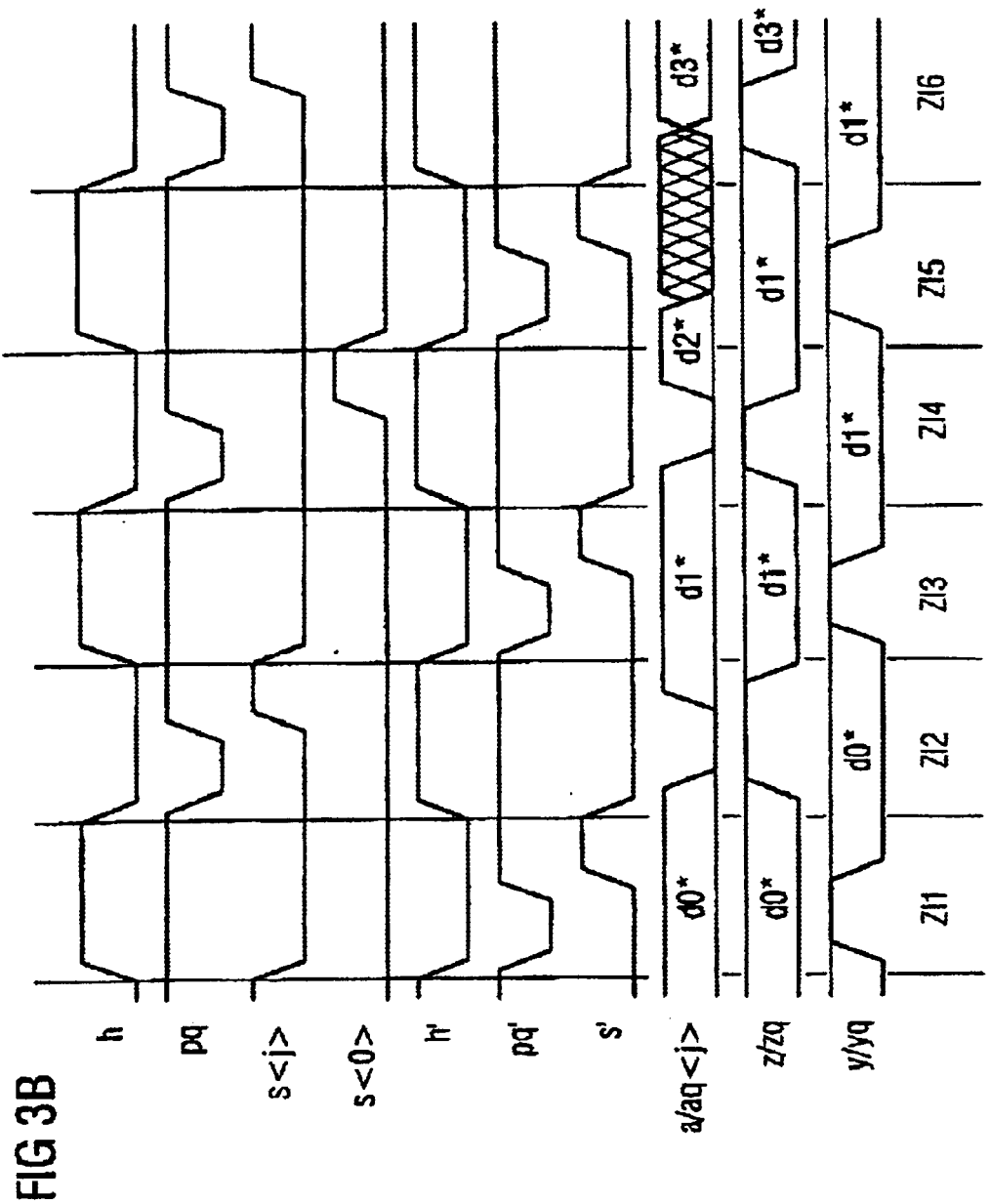

For the variant shown in FIG. 3a, it holds true that the transistor groups concerning the data signal (z, zq) match those in FIG. 2a, while the transistor groups responsible for the data signal (y, yq) are not designed using complementary components. In addition, however, two respective inverters for the first and second data transmission devices DE1, DE2 and other control elements are necessary, which can be seen in FIG. 3b.

Figure 4A:
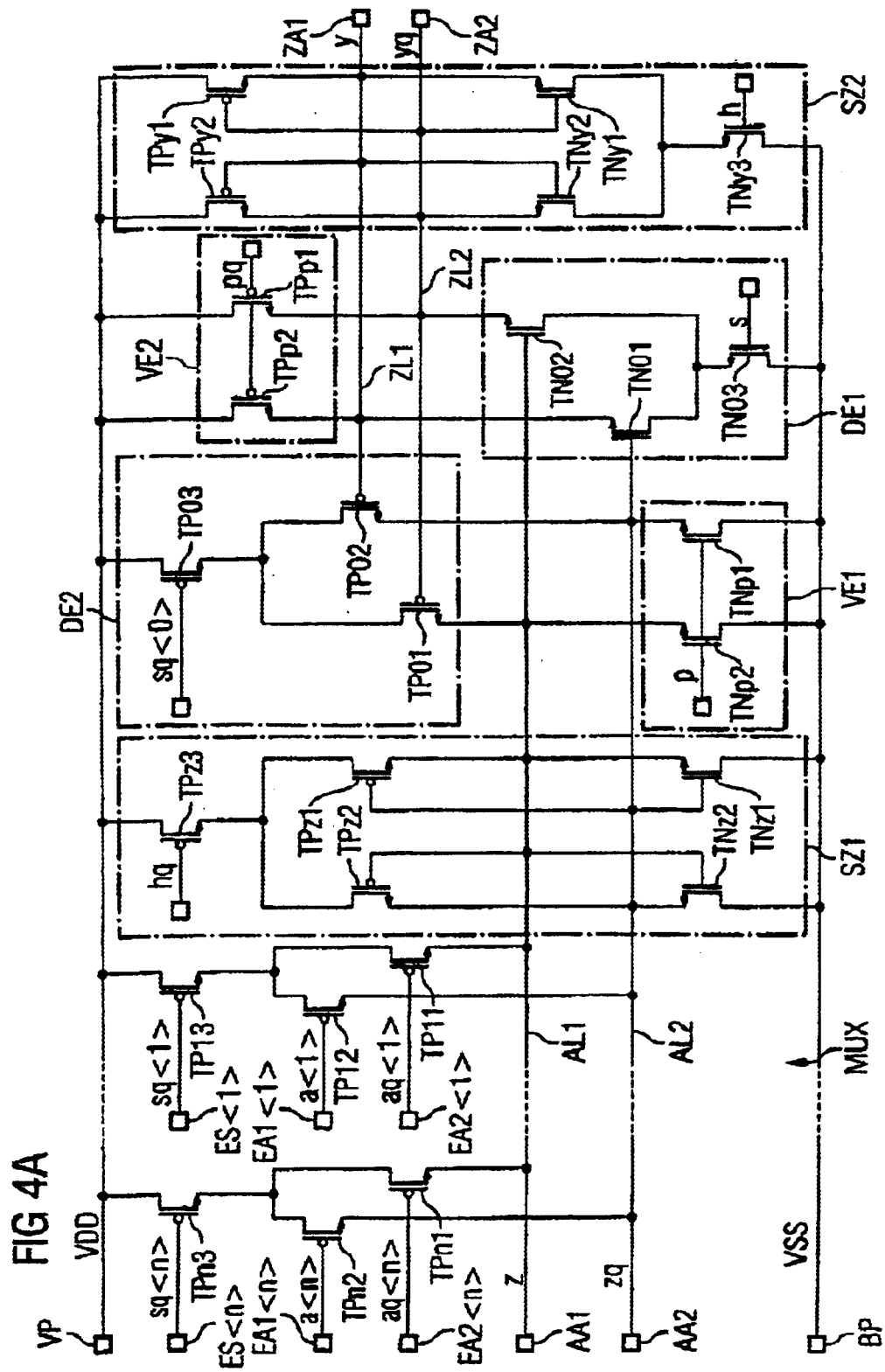
FIG. 4a shows a third exemplary embodiment of the inventive circuit.

The third exemplary embodiment, shown in FIG. 4a, is of entirely complementary design as compared with the first exemplary embodiment from FIG. 2a. Each of the transistor groups in FIG. 4a has a complementary counterpart in FIG. 2a. By way of example, the result of this is that the first lines AL1, AL2 now have a precharge state of (0,0). By contrast, the precharge state of the second lines ZL1, ZL2 is (1,1).

Figure 5B:
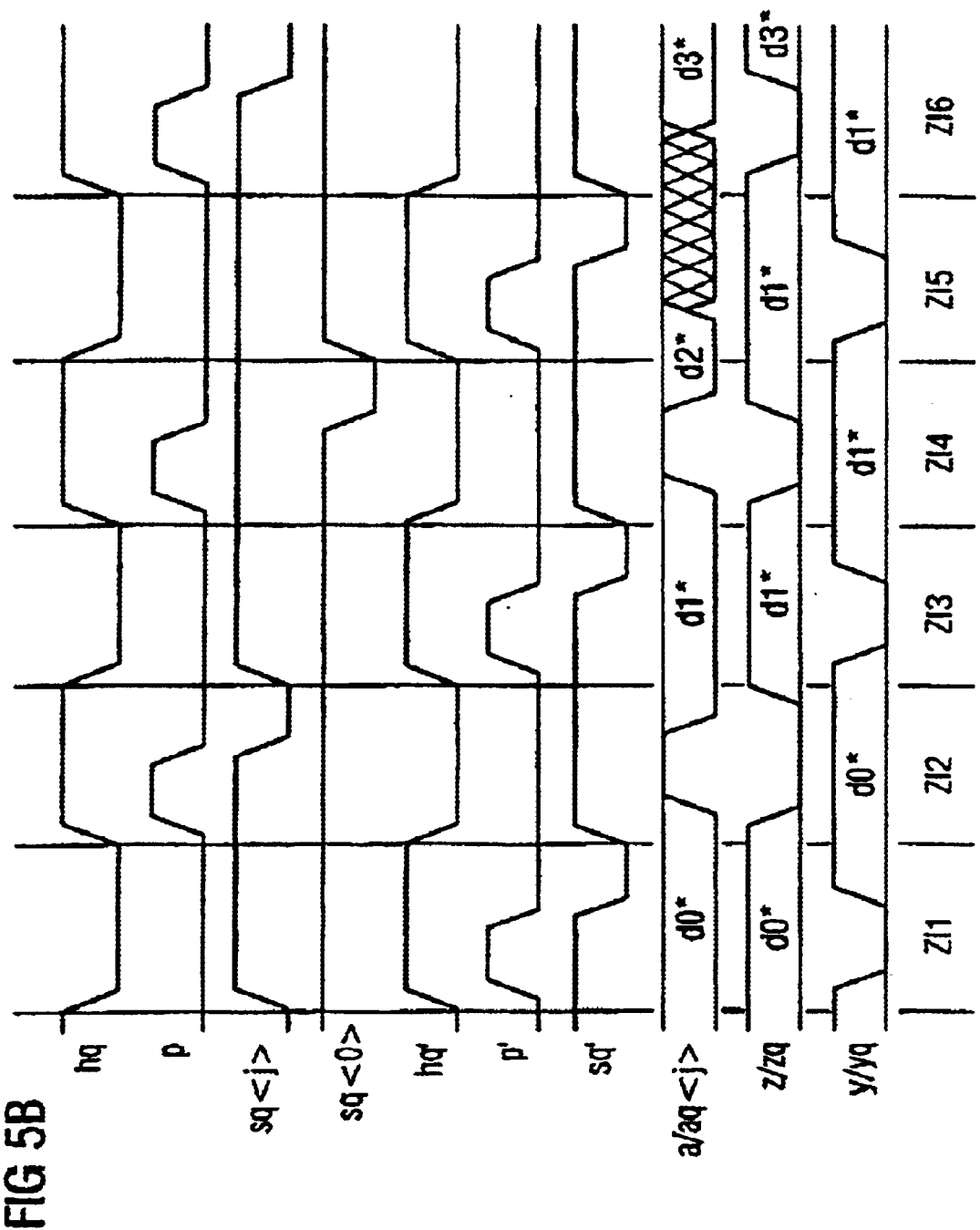

The fourth exemplary embodiment, shown in FIG. 5a, is finally designed to be entirely complementary with respect to the second exemplary embodiment shown in FIG. 3a. Each of the transistor groups from FIG. 5a has a complementary counterpart in FIG. 3a.

What is claimed is:

1. An integrated circuit comprising:
   first connections to which a dual-rail signal is applied;
   a first memory cell, which is connected to the first connections and buffer-stores the dual-rail signal applied to the first connections;
   a first precharger that precharges first lines, which are connected to the first connections;
   a first data transmission device, which forwards the dual-rail signal stored in the first memory cell to second connections, which are connected to a second memory cell which transmits the dual-rail signal to the first connections again using a second data transmission device; and
   a second precharger that precharges second lines, which are connected to the second connections.

2. The integrated circuit as claimed in claim 1, wherein the first and second memory cells comprise back-to-back connected inverters.

3. The integrated circuit as claimed in claim 1, wherein the first and second memory cells are coupled via a respective first selection transistor to a respective supply potential connection, and control connections of the respective selection transistors have a respective clock signal applied thereto, where a first logic value for the clock signal results in the first memory cell having another dual-rail signal written thereto while the second memory cell holds the dual-rail signal written thereto, and a second logic value for the clock signal results in the second memory cell having another dual-rail signal written thereto while the first memory cell holds the dual-rail signal written thereto.

4. The integrated circuit as claimed in claim 3, wherein the first precharger comprises two first switching elements which are connected between a supply potential line and a respective first line.

5. The integrated circuit as claimed in claim 1, wherein the second precharger comprises two first switching elements which are connected between a supply potential line and a respective second line.

6. The integrated circuit as claimed in claim 1, wherein the first data transmission device has two second switching elements whose control connections are respectively connected to one of the first connections, and also has a second selection transistor connected between a supply potential line and one connection on each of the two second switching elements, and where the other connection on each of the two second switching elements is connected to one of the second connections.

7. The integrated circuit as claimed in claim 1, wherein the second data transmission device has two second switching elements whose control connections are respectively connected to one of the second connections, and also has a second selection transistor connected between a supply potential line and one connection on each of the two switching elements, and where the other connection on each of the two second switching elements is connected to one of the first connections.

8. The integrated circuit as claimed in claim 1, wherein the first connections are output connections which form a data output and are connected via a circuit arrangement to a data input which comprises at least two input connections and to which the dual-rail signal is applied, where the circuit arrangement passes the dual-rail signal applied to the input connections to the output connections on the basis of a selection signal.

9. The integrated circuit as claimed in claim 8, wherein the data input is in the form of a multiplexer.

10. A method for operating an integrated circuit as claimed in claim 3, wherein the first selection transistors for the first and second memory cells have a clock signal (h) applied thereto;
   the first precharger is activated as a result of a falling clock edge;

the second precharger is activated as a result of a rising clock edge;

the first data transmission device is activated following deactivation of the second precharger as a result of which the dual-rail signal applied to the first connections is transmitted to the second memory cell; and the second data transmission device is activated if the dual-rail signal stored in the second memory cell needs to be available on the first output connections.

11. The method as claimed in claim 10, wherein the first precharger (VE1) comprises two first switching elements which are connected between a supply potential line and a respective first line;

wherein the second precharger comprises two first switching elements which are connected between a supply potential line and a respective second line; and wherein the first and second prechargers are activated by actuating the first respective switching elements.

12. The method as claimed in claim 11, wherein the first and second data transmission devices are activated by actuating a respective second selection transistor.

13. The method as claimed in claim 10, wherein the switching elements and selection transistors are actuated using a control circuit.

* * * * *